US012210003B2

(12) United States Patent
Tobita et al.

(10) Patent No.: US 12,210,003 B2
(45) Date of Patent: Jan. 28, 2025

(54) LIQUID CHROMATOGRAPHIC APPARATUS AND AIR BUBBLE REMOVAL METHOD OF LIQUID CHROMATOGRAPHIC APPARATUS

(71) Applicant: HITACHI HIGH-TECH CORPORATION, Tokyo (JP)

(72) Inventors: Midori Tobita, Tokyo (JP); Yuichiro Hashimoto, Tokyo (JP); Nobuhiro Tsukada, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 229 days.

(21) Appl. No.: 17/911,763

(22) PCT Filed: Mar. 5, 2021

(86) PCT No.: PCT/JP2021/008751
§ 371 (c)(1),
(2) Date: Sep. 15, 2022

(87) PCT Pub. No.: WO2021/187172
PCT Pub. Date: Sep. 23, 2021

(65) Prior Publication Data
US 2023/0123459 A1   Apr. 20, 2023

(30) Foreign Application Priority Data

Mar. 19, 2020   (JP) ................. 2020-049500

(51) Int. Cl.
*G01N 30/32*   (2006.01)
(52) U.S. Cl.
CPC ....... *G01N 30/32* (2013.01); *G01N 2030/326* (2013.01); *G01N 2030/328* (2013.01)
(58) Field of Classification Search
None
See application file for complete search history.

(56) References Cited

U.S. PATENT DOCUMENTS

| 5,393,420 A * | 2/1995 | Hutchins ........ G01N 30/32 |
| | | 210/101 |
| 5,393,434 A * | 2/1995 | Hutchins ........ G01N 30/32 |
| | | 210/659 |

(Continued)

FOREIGN PATENT DOCUMENTS

| CN | 1490522 A | 4/2004 |
| CN | 108474761 A | 8/2018 |

(Continued)

OTHER PUBLICATIONS

Office Action mailed Feb. 29, 2024 in Chinese Application No. 202180016873.X.

(Continued)

*Primary Examiner* — Brandi N Hopkins
*Assistant Examiner* — Nigel H Plumb
(74) *Attorney, Agent, or Firm* — Miles & Stockbridge, P.C.

(57) ABSTRACT

A liquid chromatographic apparatus which removes air bubbles during preparatory operation for apparatus startup includes a liquid feeding pump to feed a solvent, an injector to inject a sample into the solvent, a separation column to receive the solvent and the sample through the injector and separate the sample into components, a detector to detect the components supplied from the separation column, a pressure sensor to measure a pressure in a solvent flow channel of the liquid feeding pump, and a controller to control a purge operation for removing air bubbles in the solvent flow channel by the liquid feeding pump, determine whether a pressure change amount in the solvent flow channel measured by the pressure sensor during the purge operation is a specified change amount or larger, and complete the air bubble removal operation when the pressure change amount is the specified change amount or larger.

11 Claims, 10 Drawing Sheets

(56) References Cited

U.S. PATENT DOCUMENTS

2005/0095145 A1    5/2005   Hiraku et al.
2019/0013192 A1    1/2019   Nakano

FOREIGN PATENT DOCUMENTS

| JP | H10-227799 A | 8/1998 |
|---|---|---|
| JP | H11-326300 A | 11/1999 |
| JP | 2004-507639 A | 3/2004 |
| JP | 2014-228499 A | 12/2014 |
| WO | 02016770 A1 | 2/2002 |

OTHER PUBLICATIONS

Search Report mailed Mar. 13, 2024 in European Application No. 21772388.1.
Search Report mailed May 25, 2021 in International Application No. PCT/JP2021/008751.
Written Opinion mailed May 25, 2021 in International Application No. PCT/JP2021/008751.
International Preliminary Report on Patentability mailed Nov. 30, 2021 in International Application No. PCT/JP2021/008751.

* cited by examiner

PRESSURE CHANGE DURING PURGE - WITH AIR BUBBLES

LIQUID CHROMATOGRAPHIC APPARATUS AND AIR BUBBLE REMOVAL METHOD OF LIQUID CHROMATOGRAPHIC APPARATUS

TECHNICAL FIELD

The present invention relates to a liquid chromatographic apparatus and an air bubble removal method of a liquid chromatographic apparatus.

BACKGROUND ART

In the prior art, at the start of HPLC (liquid chromatography) analysis, purge operation of a liquid feeding pump is performed in order to remove the air bubbles mixed (trapped) in a flow channel and replace the solvent.

Particularly in a liquid chromatographic apparatus, different solvents are not put in one pipe, so the need to perform purge operation for the purpose of solvent replacement is not so strong and purge operation is performed in order to remove air bubbles.

Usually, purge operation is performed by opening a purge valve and feeding a liquid for purging at a flow rate several times to tens of times higher than the flow rate that is used for analysis. Even when sufficient purge operation for the system capacity is performed, in some cases air bubbles tend to remain due to factors such as the pump inside structure and solvent viscosity.

Patent Literature 1 describes a technique that keeps the liquid feed flow rate constant even if air bubbles are mixed during normal liquid feeding.

CITATION LIST

Patent Literature 1: Japanese Unexamined Patent Application Publication (Translation of PCT Application) No. 2004-507639

SUMMARY OF INVENTION

Technical Problem

In a liquid chromatographic apparatus, since mixing-in of air bubbles interferes with liquid feeding at an accurate flow rate, it must be avoided. However, it is difficult to judge whether or not air bubbles are mixed in the flow channel that cannot be checked visually and there have been cases that a liquid feed error is found after the start of normal liquid feeding or after start of analysis and purging must be done again.

For example, in a liquid feeding device that feeds a liquid at a high pressure, the pump chamber is usually made of a metal in order to withstand the high pressure. For this reason, it is difficult to judge whether or not air bubbles get mixed during purge operation even if purging is thought to have been performed sufficiently to remove air bubbles.

In the case of conventional ordinary HPLC, whether or not air bubbles get mixed is judged by performing normal liquid feeding after the end of purging and checking the stability in liquid feed pressure to confirm that the liquid is fed at a constant flow rate.

However, in the case of a liquid chromatographic apparatus, it is desirable that completion of purging for removal of air bubbles can be confirmed during preparatory operation at the startup of the apparatus.

In the technique described in Patent Literature 1, whether or not there are air bubbles is not judged at the end of purging. In addition, the technique described in Patent Literature 1 is a technique to keep the liquid feed flow rate constant even when air bubbles get mixed during normal liquid feeding and it is not a technique to remove air bubbles but it allows presence of air bubbles.

However, the presence of air bubbles in the liquid usually interferes with keeping the liquid feed flow rate constant.

If a liquid feed error cannot be corrected even by repeating purge operation, one solution is to disconnect the pipe temporarily and remove air bubbles by hand using a plastic syringe. For example, if the flow channel is a flow channel that uses an aqueous solvent, an organic solvent such as isopropanol or methanol may be used to perform purging to remove air bubbles before purging the aqueous solvent for the purpose of solvent replacement. In this case, troublesome manual work such as disconnection of the pipe and change of the solvent bottle may be needed.

The object of the present invention is to realize a liquid chromatographic apparatus that can remove air bubbles during preparatory operation at the startup of the apparatus without the need for troublesome work, and an air bubble removal method of the liquid chromatographic apparatus.

Solution to Problem

In order to achieve the above object, the present invention is configured as follows.

A liquid chromatographic apparatus comprises: a liquid feeding pump to feed a solvent; an injector to inject a sample into the solvent fed from the liquid feeding pump; a separation column to receive the solvent and the sample through the injector and separate the sample to components; a detector to detect the components supplied from the separation column; a pressure sensor to measure a pressure in a solvent flow channel of the liquid feeding pump; and a controller to control operation of the liquid feeding pump. The controller controls purge operation that is operation of removing air bubbles in the solvent flow channel by the liquid feeding pump, judges whether or not a pressure change amount in the solvent flow channel measured by the pressure sensor is a specified change amount or larger in the purge operation, and completes the air bubble removal operation when the pressure change amount is the specified change amount or larger.

In an air bubble removal method of a liquid chromatographic apparatus that includes a liquid feeding pump to feed a solvent, a separation column to receive the solvent and a sample and separate the sample to components, a detector to detect the components, and a pressure sensor to measure a pressure in a solvent flow channel of the liquid feeding pump, purge operation as operation of removing air bubbles in the solvent flow channel by the liquid feeding pump is started; a judgement is made as to whether or not the pressure change amount in the solvent flow channel measured by the pressure sensor is a specified change amount or larger in the purge operation; and the air bubble removal operation is completed when the pressure change amount is the specified change amount or larger.

Advantageous Effects of Invention

According to the present invention, it is possible to realize a liquid chromatographic apparatus that can remove air bubbles during preparatory operation at the startup of the apparatus without the need for troublesome work, and an air bubble removal method of the liquid chromatographic apparatus.

DESCRIPTION OF EMBODIMENTS

Hereinafter, embodiments of the present invention will be described referring to the accompanying drawings.

EMBODIMENTS

First Embodiment

Figure 1:
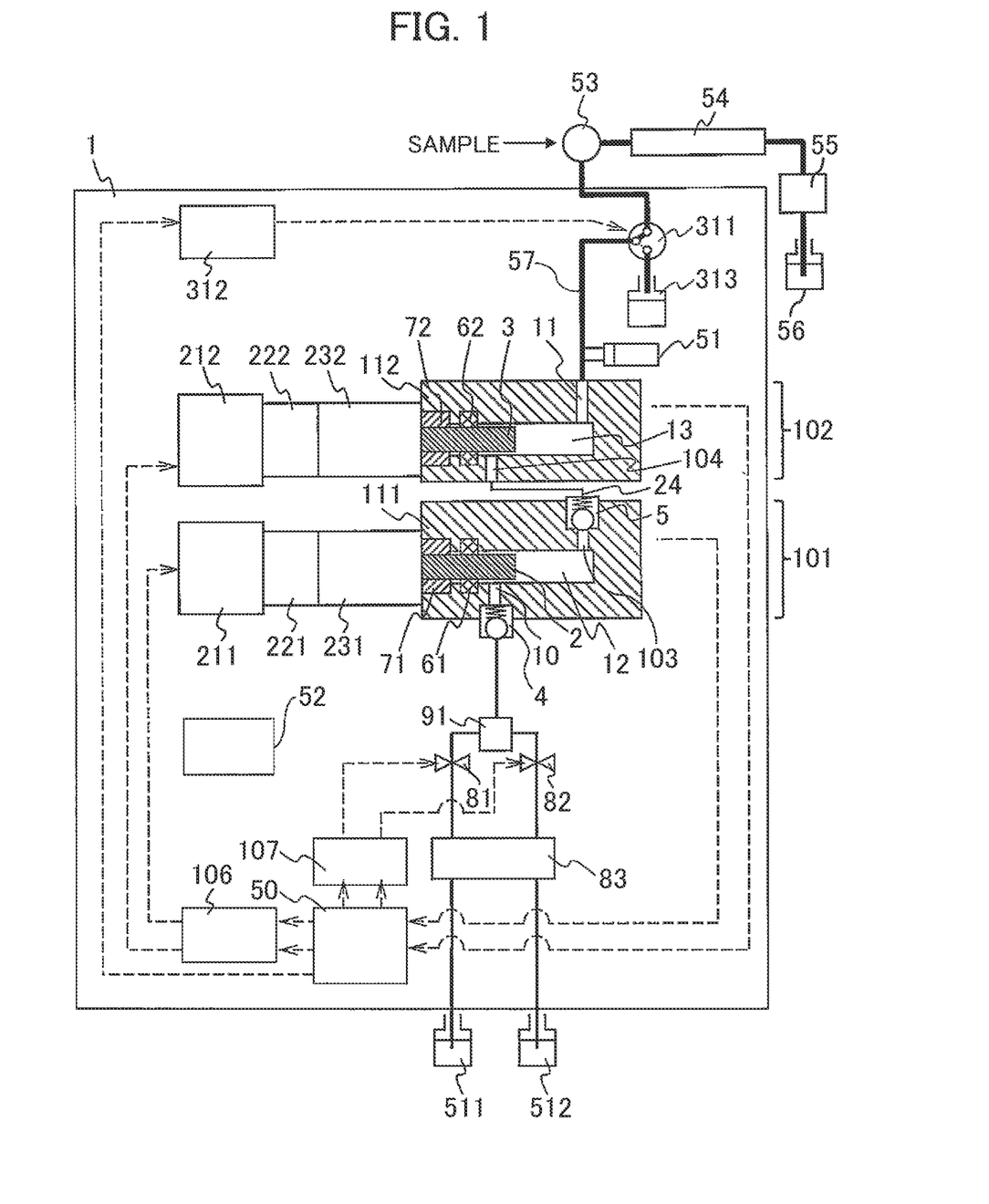
FIG. 1 is a configuration diagram of a liquid chromatographic apparatus according to First Embodiment.

FIG. 1 is a configuration diagram of a liquid chromatographic apparatus according to the first embodiment of the present invention, which shows details of a liquid feeding pump 1 as the key component of the first embodiment.

In FIG. 1, the liquid feeding pump 1 includes a first plunger pump 101, a second plunger pump 102, a first solenoid valve 81, a second solenoid valve 82, a degasser 83, a purge valve 311, a controller 50, a display unit 52, a motor driver 106, a solenoid valve driver 107, and a purge valve driver 312. The first plunger pump 101 and second plunger pump 102 are connected to each other in series.

The first plunger pump 101 includes a first pump head 111. The first pump head 111 includes a first aspiration passage 10, a first discharge passage 103, and a first pressurizing chamber 12. In the first aspiration passage 10, a first check valve 4 is installed on the passage, in the first discharge passage 103, a second check valve 5 is installed on the passage, and the first check valve 4 and second check valve 5 limit the direction in which the solvent flows.

The second plunger pump 102 includes a second pump head 112. The second pump head 112 includes a second aspiration passage 104, a second discharge passage 11, and a second pressurizing chamber 13. The second check valve 5 and second aspiration passage 104 are connected by a connecting flow channel 24. In other words, the first plunger pump 101 and second plunger pump 102 are connected to each other in series and the first plunger pump 101 is located on the upstream side.

The first plunger pump 101 slidably holds the first plunger 2 as a pressurizing member by a bearing 71.

The second plunger pump 102 slidably holds the second plunger 3 as a pressurizing member by a bearing 72.

A first seal 61 in the first plunger pump 101 prevents liquid leakage from the first pressurizing chamber 12 and a second seal 62 in the second plunger pump 102 prevents liquid leakage from the second pressurizing chamber 13.

When the first plunger pump 101 aspirates a solvent, one of the first solenoid valve 81 and the second solenoid valve 82 is open and the other one is closed so that one of a first solvent 511 and a second solvent 512 is aspirated.

Here, a case that three or more types of solvents are set may be assumed. If that is the case, as many solenoid valves as the set solvents are installed and one type of solvent is aspirated with one of the valves open and the other valves closed.

The aspirated solvent is passed through the degasser 83 installed upstream of the solenoid valves 81 and 82 to be degassed and passed through a converging part 91, the first check valve 4 and the first aspiration passage 10 that are located downstream of the solenoid valves 81 and 82, before being aspirated into the first pressurizing chamber 12. The solvent aspirated into the first pressurizing chamber 12 is compressed with the ascent of the first plunger 2.

The "ascent" of a plunger means movement in the direction in which the solvent in the pressurizing chamber is compressed or discharged (leftward movement in FIG. 1) and the "descent" means movement in the direction in which the solvent is aspirated (rightward movement in FIG. 1).

When the pressure of the solvent compressed in the first pressurizing chamber 12 is higher than the pressure in the second pressurizing chamber 13, the solvent passes through the first discharge passage 103, second check valve 5, connecting flow channel 24, and second aspiration passage 104 and flows into the second pressurizing chamber 13 and is discharged from the second discharge passage 11.

The pressure sensor 51 is located downstream of the second plunger pump 102 and measures the pressure of the solvent in the solvent flow channel 57 extending from the second discharge passage 11 to the purge valve 311.

The controller 50 gives the motor driver 106, solenoid valve driver 107 and purge valve driver 312 a command value according to the signal indicating the pressure of the solvent from the pressure sensor 51.

The motor driver 106 gives a first electric motor 211 and a second electric motor 212 driving electric power according to the command value of the controller 50. The first electric motor 211 drives the first plunger 2 through a deceleration device 221 and a direct acting device 231. The second electric motor 212 drives the second plunger 3 through a deceleration device 222 and a direct acting device 232.

The solenoid valve driver 107 gives the first solenoid valve 81 and second solenoid valve 82 driving electric power according to the command value of the controller 50. The purge valve driver 312 gives the purge valve 311 driving electric power according to the command value of the controller 50.

A sample as the object of analysis is injected into the solvent discharged from the purge valve 311 of the liquid feeding pump 1, by the injector 53. The solvent into which the sample has been injected by the injector 53 (sample and solvent) is supplied to the separation column 54 and separated into components by the separation column 54. After that, the sample is supplied from the separation column 54 to the detector 55. Then, the detector 55 detects the sample components and detects the absorbance, fluorescence intensity, refraction index and mass of each sample component. The waste liquid from the detector 55 is collected in a waste liquid container 56.

The separation column 54 is filled with microparticles and a load pressure is generated by flow channel resistance as the solvent flows in gaps between microparticles. The magnitude of the load pressure differs depending on the diameter of the separation column 54 and the flow rate.

When changing the solvent to be used in the liquid chromatographic apparatus, from the first solvent 511 to the second solvent 512, the first solenoid valve 81 is switched from the open state to the closed state and then the second solenoid valve 82 is switched from the closed state to the open state. Consequently, the first solvent 511 is replaced by the second solvent 512 inside the liquid feeding pump 1 (first check valve 4, first aspiration passage 10, first pressurizing chamber 12, first discharge passage 103, connecting flow channel 24, second aspiration passage 104, second pressurizing chamber 13, and second discharge passage 11) and inside the injector 53, the separation column 54, the detector 55 and the pipes connecting them.

The first solvent 511 and second solvent 512 can be mixed and used by changing the ratio of opening between the first solenoid valve 81 and second solenoid valve 82. If three or more types of solvents are used in the liquid chromatographic apparatus, a solenoid valve may be provided for each solvent so that the ratio can be changed by switching these solenoid valves.

Next, the normal liquid feeding process of the liquid feeding pump 1 will be explained.

Normal liquid feeding is a liquid feeding method for the case that the solvent discharged from the liquid feeding pump 1 is flown to the injector 53, separation column 54 and detector 55 to analyze the sample or prepare for analysis.

At this time, since the detection accuracy declines with pulsation of the discharge flow rate, the discharge flow rate must be fixed. In the interval in which the first plunger 2 descends and aspirates the solvent and the interval in which the first plunger 2 ascends and compresses the solvent, the solvent is not discharged from the first pressurizing chamber 12 and thus the second plunger 3 ascends and discharges the solvent. After that, in the interval in which the second plunger 3 descends and aspirates the solvent, the first plunger 2 ascends and discharges the solvent aspirated by the second plunger 3 and the solvent to be discharged downstream of the pump. After that, the first plunger 2 ascends and discharges the solvent and the second plunger 3 stops.

These actions keep the discharge flow rate from the liquid feeding pump 1 constant. When the discharge flow rate is kept constant, the discharge pressure also becomes constant.

In the normal liquid feeding process, both the first plunger 2 and second plunger 3 move with reference to the lower limit point. The lower limit point denotes the lowermost position to which the plunger descends, in the range in which the plunger can move in the pressurizing chamber. On the other hand, the upper limit point denotes the uppermost position to which the plunger ascends, in the range in which the plunger can move in the pressurizing chamber. By contrast, the bottom dead center and top dead center mean both ends of the stroke of the plunger.

Therefore, when the stroke range changes, the bottom dead center and top dead center also change. In this specification, the lower limit point/upper limit point and the bottom dead center/top dead center have different meanings.

The pressure sensor 51 is installed downstream of the second plunger pump 102 and the purge valve 311 is connected further downstream.

The purge valve 311 has a plurality of ports and by switching these ports to a plurality of positions, whether to feed the solvent to the injector 53 can be changed. The purge valve 311 can elect to feed the solvent to the waste liquid tank 313. Also, it can be set to the closed position, which will be explained later.

Figure 2A:
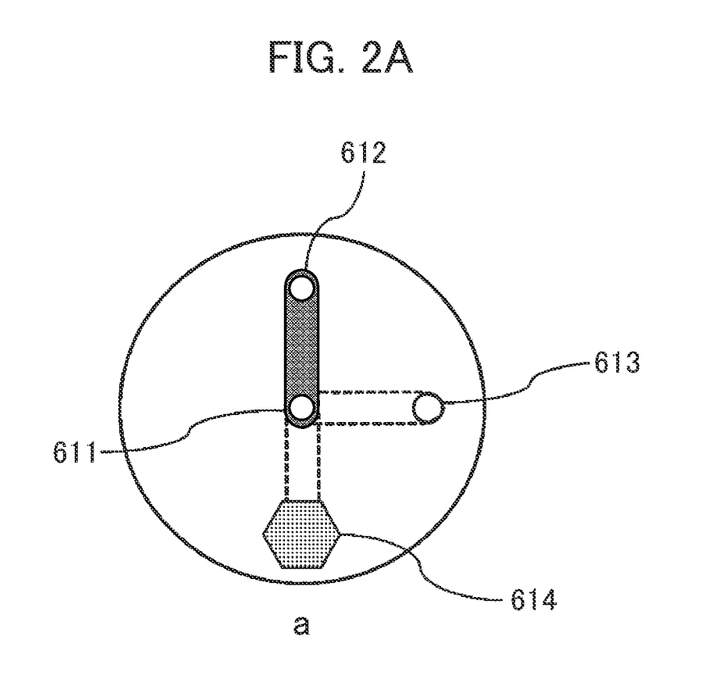
FIG. 2A is a view showing an example of a purge valve according to First Embodiment.
Figure 2B:
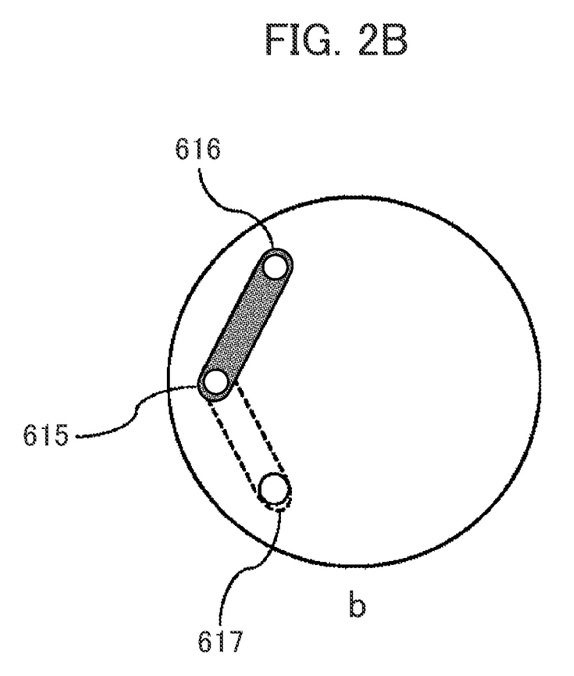
FIG. 2B is a view showing another example of a purge valve according to First Embodiment.

FIG. 2A shows one example of the purge valve 311 and FIG. 2B shows another example.

In the purge valve a shown in FIG. 2A, the solvent discharged from the liquid feeding pump 1 enters a port 611. For example, a port 612 is connected to the injector 53 side and a port 613 is connected to the waste liquid tank 313 side, and a sealing stopper is installed on a port 614.

The port 611 is connected to the port 612 side during normal liquid feeding or after start of analysis and connected to the port 613 during purge operation. When the closed position is used to perform purge operation in order to discharge air bubbles effectively, the port 611 is connected to the port 614. The port 614 as one of the ports 612, 613 and 614 is sealed and the sealed port is used for the closed position.

In the purge valve b shown in FIG. 2B, the solvent discharged from the liquid feeding pump 1 enters a port 615 and is discharged to either a port 616 or a port 617. For example, the port 616 is connected to the injector 53 side and the port 617 is connected to the waste liquid tank 313 side.

By providing a closed position in which the flow channel between the port 615 and port 616 of the purge valve b or between the port 615 and port 617 is not open (the flow channel is closed) and switching to the closed position, it can be used in the same way as the port 614 with the sealing stopper in the purge valve a. In other words, in a valve in which ports are changed by rotation of 60 degrees, the closed position can be obtained, for example, by rotation of 30 degrees (the valve is used for the closed position).

In the purge operation process, in transition from normal liquid feeding, the first plunger 2 and second plunger 3 once stop and the purge valve 311 is switched to the waste liquid tank 313 side. Then, after the first plunger 2 ascends to the upper limit point, the second plunger 3 ascends to the upper limit point. Then, the solenoid valve 81 or solenoid valve 82 for the solvent to be purged is switched to the open state to start purge operation.

Purge operation is performed when only the first plunger 2 reciprocates between the upper limit point and lower limit point while the second plunger 3 remains stopped. At this time, the discharge flow rate is intermittent and accordingly the pressure pulsates.

However, since the flow channel resistance of the pipe that connects the purge valve 311 and the waste liquid tank 313 is smaller than the fluid resistance of the separation column 54, the maximum pressure during purge operation is smaller than the pressure during normal liquid feeding.

During purge operation, analysis of the sample is not made and the solvent does not flow in the separation column 54 and detector 55, so there is no problem even though the flow rate and pressure pulsate.

Figure 3A:
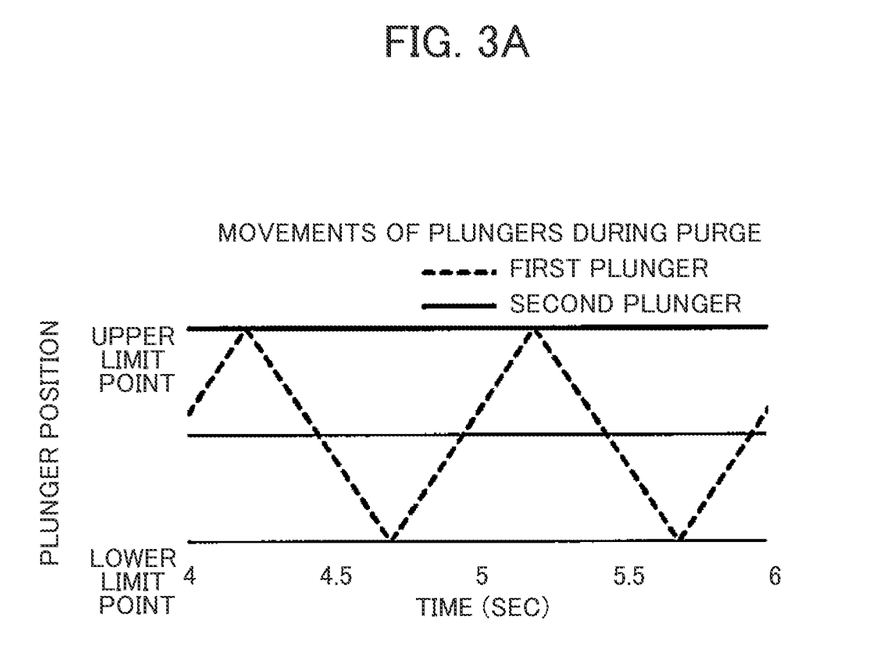
FIG. 3A is a view showing movements of a first plunger and a second plunger during purge operation according to First Embodiment.

FIG. 3A is a view showing movements of the first plunger 2 and second plunger 3 during purge operation according to the first embodiment.

Figure 3B:
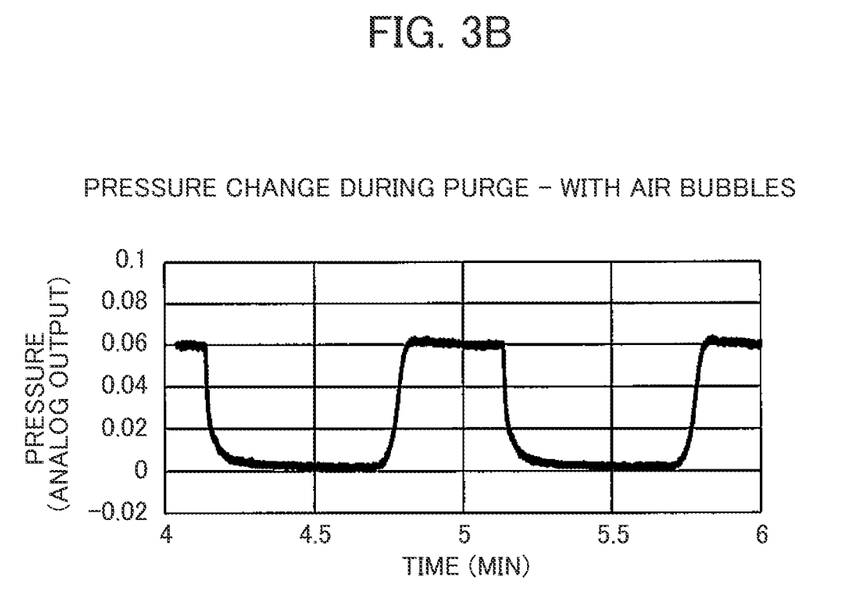
FIG. 3B is a view showing pressure change responding to movements of the first plunger and the second plunger shown in FIG. 3A when air bubbles get mixed.
Figure 3C:
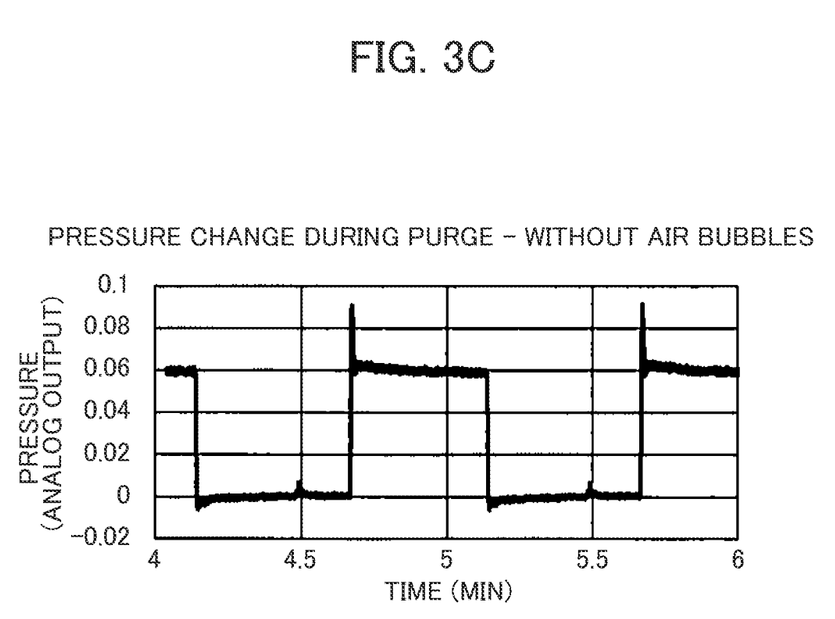
FIG. 3C is a view showing pressure change responding to movements of the first plunger 2 and the second plunger 3 shown in FIG. 3A when air bubbles do not get mixed.

In FIG. 3A, the dotted line indicates the movement of the first plunger 2 which repeats aspiration and discharge and the solid line indicates that the second plunger 3 remains stopped at the upper limit point. FIG. 3B is a view showing pressure change in response to the movements of the first plunger 2 and second plunger 3 shown in FIG. 3A when air bubbles get mixed. FIG. 3C is a view showing pressure change in response to the movements of the first plunger 2 and the second plunger 3 shown in FIG. 3A when air bubbles do not get mixed.

Figure 3D:
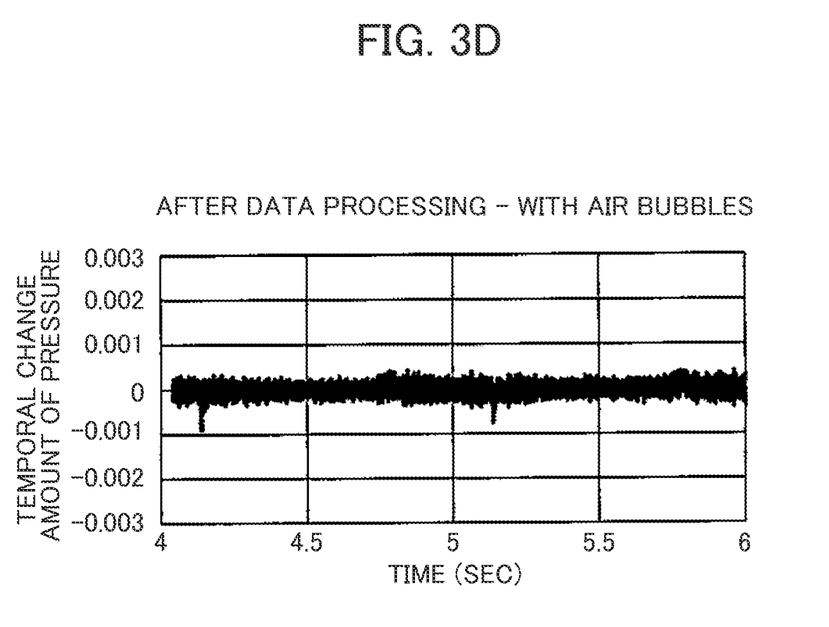
FIG. 3D is a view showing results of differentiated and calculated moving average in order to obtain a temporal change amount of pressure when air bubbles get mixed as shown in FIG. 3B.
Figure 3E:
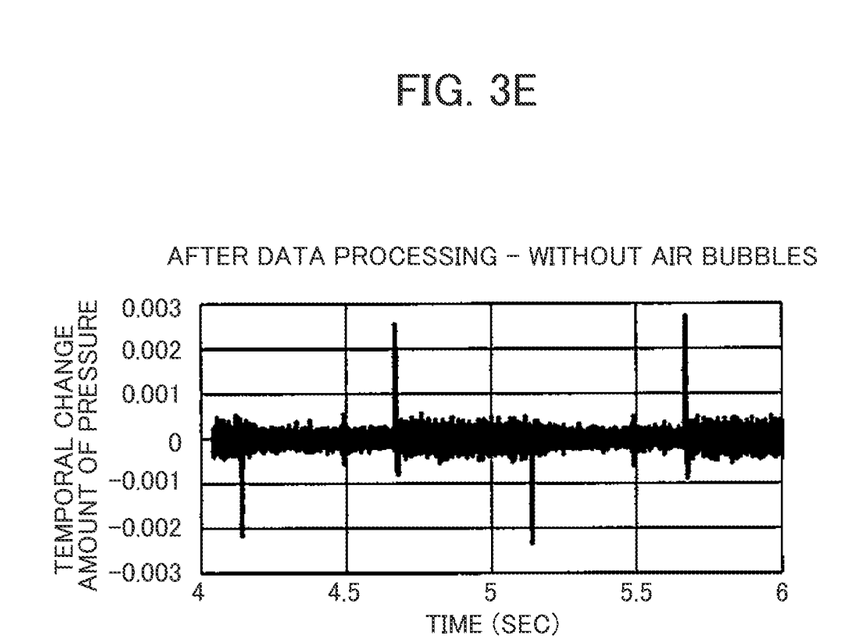
FIG. 3E is a view showing results of differentiated and calculated moving average in order to obtain a temporal change amount of pressure when air bubbles do not get mixed as shown in FIG. 3C.

FIG. 3D is a view showing results of calculation of moving average by differentiation in order to obtain a temporal change amount of pressure when air bubbles get mixed as shown in FIG. 3B. FIG. 3E is a view showing results of calculation of moving average by differentiation in order to obtain a temporal change amount of pressure when air bubbles do not get mixed as shown in FIG. 3C.

The method for calculating the amount of temporal change of pressure is not limited to the method described above as far as the difference between the temporal change amount of pressure during purging and the temporal change amount of pressure during discharge without mixed air bubbles is clearly known.

When air bubbles get mixed in the solvent, there is no significant change in the temporal change amount of pressure as shown in FIG. 3D.

However, when air bubbles do not get mixed, a significant change in the temporal change amount of pressure is seen at the time when the first plunger 2 starts moving up, namely at the time of start of discharge, as shown in FIG. 3E. When the temporal change amount of pressure is N times (a specified number of times) the average change amount or larger and such case is observed consecutively M times (a specified number of times) or more, the change amount of pressure in the solvent flow channel is judged to be a specified change amount or larger, so that removal of air bubbles can be judged to be completed.

Here, N is an arbitrary value that is larger than 1 and enables discrimination from noise and M should be an arbitrary integer not smaller than 2. The value of N can be changed according to the type of solvent: for example, for an aqueous solvent, 3 (times) is set and for an organic solvent, 2 (times) is set.

The value of M is an arbitrary value to prevent erroneous judgement caused by noise, using the average value and for example, it is set to 5 (times).

Figure 4:
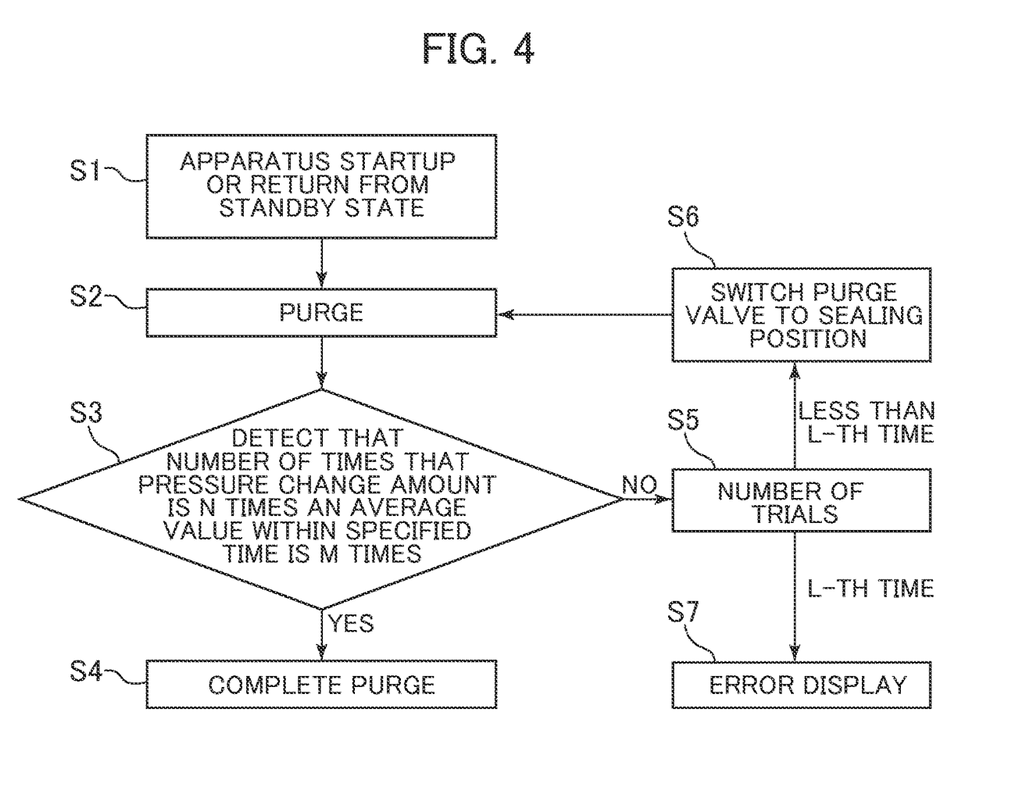
FIG. 4 is a flowchart showing a process of judging air bubble removal completion.

FIG. 4 is a flowchart showing the process of judging air bubble removal completion. The operation control shown in the flowchart of FIG. 4 is performed by the controller 50.

At Step S1 in FIG. 4, removal of air bubbles and the process of judging removal of air bubbles are carried out at the startup of the apparatus or at the time of return from the standby state after the apparatus has stopped for several hours.

At Step S2, purge operation is started. Purge operation may be started at the startup of the apparatus or in the process of return from the standby state automatically or at a desired time.

After start of purge operation, at Step 3 a judgement is made as to whether or not the number of times that the change amount of pressure detected by the pressure sensor 51 is N times the average change amount in a specified time period is M times or larger.

If the number of times that the change amount of pressure is N times the average change amount is judged to be M times or larger, removal of air bubbles is judged to be completed and at Step S4, purging is completed.

At Step S3, if the number of times that the change amount of pressure is N times the average change amount in the specified time period is judged to be not M times or larger, removal of air bubbles is judged to be not completed and the process goes to Step S5.

At Step S5, a judgement is made as to whether or not the number of trials (the number of trials of removal of air bubbles that are repeated when removal of air bubbles is judged to be not completed) is less than L times. If the number of trials is judged to be less than L times, the process goes to Step S6.

At Step S6, the purge valve 311 is switched to the closed position (the closed position of the sealing port 614 in FIG. 2A or the closed position in which the flow channel between ports of the purge valve 311 shown in FIG. 2B is not open). This operation increases the pressure in the solvent flow channel and when the pressure in the solvent flow channel exceeds a set pressure, the purge valve 311 is switched to the port 613 or port 617 connected to the waste liquid tank 313 (position for discarding the solvent) to open the flow channel at once so that air bubbles are removed effectively. Here, the set pressure is set to a value that does not exceed the upper limit pressure determined for the apparatus configuration.

After that, the process goes back to Step S2 and purge operation is performed again using the purge valve 311. Then, the process goes to Step S3 and if the number of times that the change amount of pressure is N times the average change amount in the specified time period is judged to be M times or larger, removal of air bubbles is judged to be completed and at Step S4 purging is completed.

If at Step S3 the number of times that the change amount of pressure is N times the average change amount in the specified time period is judged to be not M times or larger, removal of air bubbles is judged to be not completed and the process goes to Step S5.

If at Step S5 a judgement that removal of air bubbles is completed is not made even when purging has been performed L times (a specified number of times) with the purge valve 311 switched to the closed position, the process goes to Step S7 and an error is shown on the display unit 52.

Here, the desired number of times can be set as L for the number of times of judgement. If an error is shown on the display unit 52, the display unit 52 indicates, for example, deterioration of the seal 61 or 62 as a consumable or a defect in a component of the apparatus such as the first solenoid valve 81, second solenoid valve 82 or pressure sensor 51 and it is judged that maintenance is needed. The need for maintenance can be shown on the display unit 52.

In the liquid chromatographic apparatus, if three or more types of solvents for liquid feeding are set, the process of judging completion of removal of air bubbles must be performed for all the set solvents. The reason is that in the case of the configuration that a plurality of HPLC flow channels from the degasser 83 are provided and connected to a single detector 55 using a switching valve, etc., the process of judging completion of removal of air bubbles must be performed for all the flow channels.

After removal of air bubbles is judged to be completed, the solvent degassed by the degasser 83 continues to flow as far as liquid feeding continues, so in normal liquid feeding, there is no concern that air bubbles may get mixed after start of analysis.

However, if the liquid chromatographic apparatus has continued to be on standby without making sample analysis and the liquid feeding pump 1 has stopped feeding the liquid for several hours, there is a concern that air bubbles may get mixed and thus the process of judging completion of removal of air bubbles must be performed again.

As described above, in the liquid chromatographic apparatus according to the first embodiment, during preparatory operation at the startup of the apparatus, the change in the pressure in the solvent flow channel during purge operation is detected by the pressure sensor 51 and the temporal change amount of pressure is calculated to judge whether or not there are air bubbles in the solvent. If there are air bubbles, the pressure in the solvent flow channel is increased to remove air bubbles.

Therefore, according to the first embodiment of the present invention, it is possible to realize a liquid chromatographic apparatus and an air bubble removal method of a liquid chromatographic apparatus that can remove air bubbles without the need for troublesome work during preparatory operation at the startup of the apparatus.

Even after air bubbles are removed by increasing the pressure in the solvent flow channel, a judgement is made as to whether or not there are air bubbles in the solvent and if removal of air bubbles is judged to be not completed, an error is shown on the display unit 52.

Consequently, liquid feeding operation with air bubbles in the solvent can be prevented and a judgement about deterioration of components and the like can be made.

Second Embodiment

Next, the second embodiment of the present invention will be described.

Figure 5:
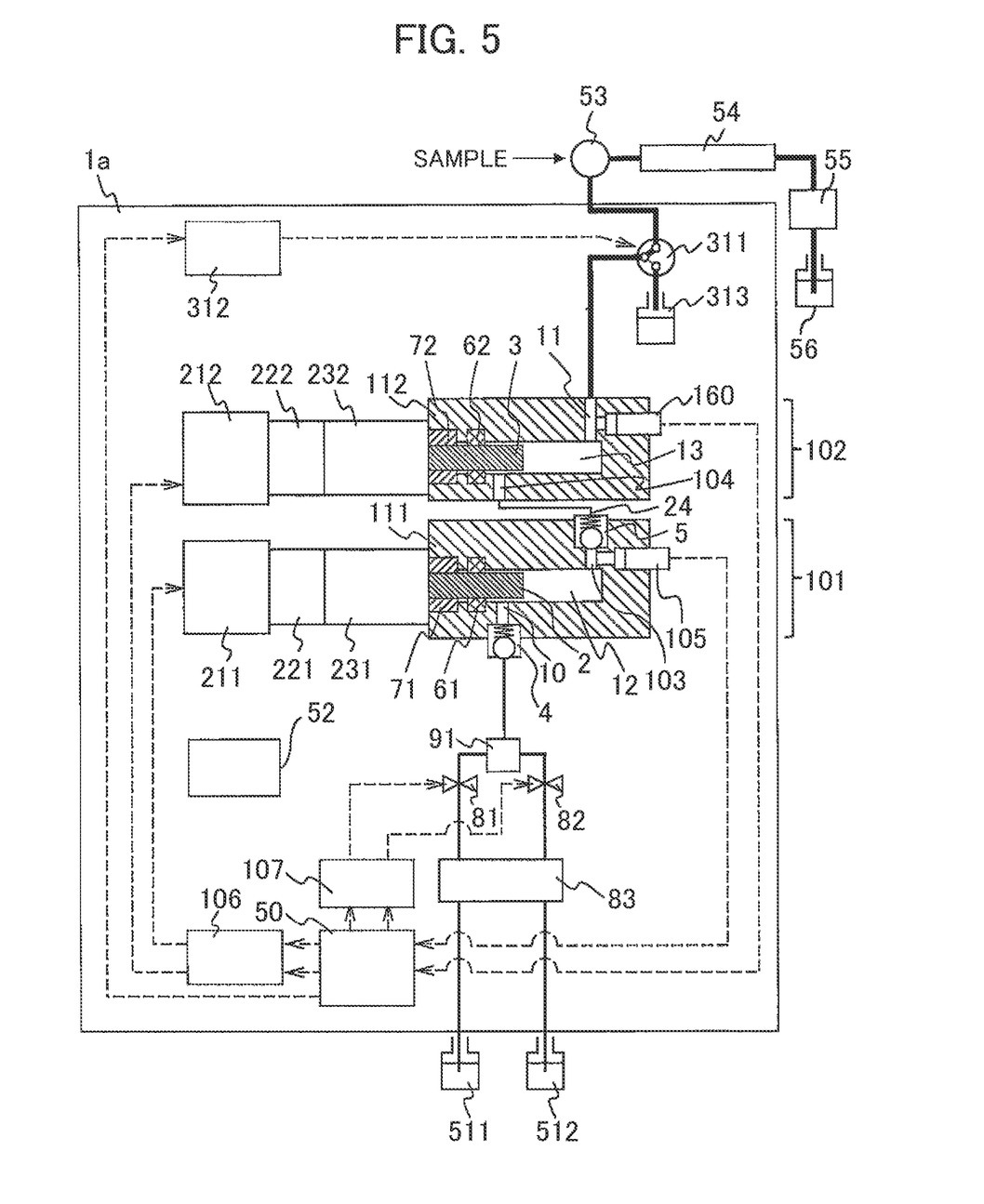
FIG. 5 is a configuration diagram of a liquid chromatographic apparatus according to Second Embodiment.

FIG. 5 is a configuration diagram of a liquid chromatographic apparatus according to the second embodiment, which shows details of the liquid feeding pump 1a as the key component in the second embodiment.

In the first embodiment shown in FIG. 1, in the liquid feeding pump 1, the pressure sensor 51 is installed only on the solvent flow channel from the second plunger pump 102.

On the other hand, in the liquid feeding pump 1a according to the second embodiment, a first pressure sensor 105 is installed on the first discharge passage 103 as the solvent flow channel in the first plunger pump 101 and measures the pressure of the solvent in the first pressurizing chamber 12. In the second embodiment shown in FIG. 5, a second pressure sensor 160 is installed on the second discharge passage 11 as the solvent flow channel in the second plunger pump 102 and measures the pressure of the solvent in the second pressurizing chamber 13.

The process of judging completion of removal of air bubbles in the second embodiment is the same as in the flowchart shown in FIG. 4 and its detailed description is omitted.

In the second embodiment, two pressure sensors, namely the first pressure sensor 105 and second pressure sensor 160, are installed.

Therefore, according to the second embodiment, the pressure in each of the first pressurizing chamber 12 and second pressurizing chamber 13 can be measured. Thus, even in the purge method in which the second plunger 3 does not stop near the upper limit point as in the first embodiment, for example, the method in which only the flow rate in normal liquid feeding is set to a high flow rate or the liquid feeding method in which the first plunger 2 and second plunger 3 are independently activated for effective purging, whether or not there are air bubbles in each of the first pressurizing chamber 12 and second pressurizing chamber 13 can be judged by detecting the amount of change of pressure during solvent discharge.

Furthermore, whether or not air bubbles are mixed by chance can be monitored even during normal liquid feeding or after start of analysis. If air bubbles are detected after start of analysis, loss of the sample as the object of analysis can be prevented by once stopping normal liquid feeding and performing the process of judging completion of removal of air bubbles.

The second embodiment brings about not only the same advantageous effects as the first embodiment but also the above advantageous effects.

Variations of the Present Invention

The present invention is not limited to the above embodiments but includes many types of variations. For example, the above embodiments have been described in detail for easy understanding of the present invention and the invention is not limited to a configuration that includes all the constituent elements described above.

For some elements of an embodiment, modification, addition and omission may be done in various ways.

The present invention can also bring about the following advantageous effects.

Since a judgment is made about completion of removal of air bubbles during purge operation, reduction in extra purge operation time, reduction in the amount of used solvent, reduction in retrial work due to detection of a liquid feeding error after start of normal liquid feeding or start of analysis can be achieved.

In purge operation that uses the closed position of the purge valve 311, air bubbles can be removed without the need for troublesome manual work to disconnect a pipe or replace a solvent bottle. In other words, wear of pipe joints can be reduced and the risk of mix-up of solvent bottles can be reduced.

The first discharge passage 103 and second discharge passage 11 can be defined as solvent flow channels like the solvent flow channel 57.

In the above embodiments, whether or not removal of air bubbles is completed is judged according to whether or not a case that the temporal change amount of pressure at the start of discharge is N times the average change amount or larger and such case is observed consecutively M times or more. However, the invention is not limited to this judgment method. For example, the following method of judgement is included in an embodiment of the present invention: a judgement is made as to whether or not the change amount of pressure in the solvent flow channel as measured by the pressure sensors 51, 105 and 160 is a specified change amount or larger, and if it is the specified change amount or larger, removal of air bubbles is judged to be completed.

LIST OF REFERENCE SIGNS 1, 1a liquid feeding pump
2 first plunger
3—second plunger
11—second discharge passage
12 first pressurizing chamber
13—second pressurizing chamber
50 controller
51 pressure sensor
52 display unit
53 injector
54 separation column
55 detector
56 waste liquid container
57 solvent flow channel
81 first solenoid valve 82—second solenoid valve
83 degasser
101 first plunger pump
102—second plunger pump
103 first discharge passage
105 first pressure sensor
106 motor driver
107 solenoid valve driver
160—second pressure sensor
211 first electric motor
212—second electric motor
311 purge valve
312 purge valve driver
511 first solvent
512—second solvent

What is claimed is:

1. A liquid chromatographic apparatus comprising:
a liquid feeding pump to feed a solvent;
an injector to inject a sample into the solvent fed from the liquid feeding pump;
a separation column to receive the solvent and the sample through the injector and separate the sample to components;
a detector to detect the components supplied from the separation column;
a pressure sensor to measure a pressure in a solvent flow channel of the liquid feeding pump; and
a controller to control operation of the liquid feeding pump,
wherein the controller: controls purge operation that is operation of removing air bubbles in the solvent flow channel by the liquid feeding pump; judges whether or not a pressure change amount in the solvent flow channel measured by the pressure sensor is a specified change amount or larger in the purge operation; and completes the air bubble removal operation when the pressure change amount is the specified change amount or larger, and
wherein the liquid feeding pump has a purge valve having a plurality of ports and switching to a position of feeding the solvent to the injector, a discarding position, or a closed position, and the controller switches the purge valve to the closed position when a number of times that the pressure change amount in the solvent flow channel is not less than specified times an average pressure change amount within a specified time is less than a specified consecutive number of times and switches the purge valve to the discarding position when the pressure in the solvent flow channel exceeds a set pressure.

2. The liquid chromatographic apparatus according to claim 1, wherein the controller: judges that the pressure change amount in the solvent flow channel is the specified change amount or larger when the number of times that the pressure change amount at the timing of start of discharge of the solvent of the liquid feeding pump is not less than the specified times the average pressure change amount within the specified time is not less than the specified consecutive number of times; and completes the air bubble removal operation.

3. The liquid chromatographic apparatus according to claim 1,
wherein one of the multiple ports is sealed, and the sealed port is used for the closed position.

4. The liquid chromatographic apparatus according to claim 1, wherein a position where a flow channel between a port and a port in the multiple ports is closed is used for the closed position.

5. The liquid chromatographic apparatus according to claim 1,
wherein the liquid feeding pump has: a first plunger pump to aspirate or discharge the solvent by sliding in a space between an upper limit point and a lower limit point; and a second plunger pump to aspirate or discharge the solvent by sliding in a space between an upper limit point and a lower limit point, the first plunger pump and the second plunger pump are connected to each other in series and connected to the solvent flow channel, the pressure sensor is connected to the downstream side of the second plunger pump, the purge valve is connected to the downstream side of the pressure sensor, and the controller controls the purge operation by reciprocating a plunger of the first plunger pump between the upper limit point and the lower limit point with a plunger of the second plunger pump stopped at the upper limit point.

6. The liquid chromatographic apparatus according to claim 1, further comprising a display unit,
wherein the controller switches the purge valve to the closed position, performs operation of switching the purge valve to the discarding position when the pressure in the solvent flow channel exceeds a set pressure and then performs the purge operation, and further displays an error on the display unit when the number of times that the pressure change amount in the solvent flow channel is not less than the specified times the average pressure change amount within the specified time is less than the specified consecutive number of times and such case occurs a certain number of times.

7. The liquid chromatographic apparatus according to claim 1,
wherein the liquid feeding pump has: a first plunger pump to aspirate or discharge the solvent by sliding in a space between an upper limit point and a lower limit point; and a second plunger pump to aspirate or discharge the solvent by sliding in a space between an upper limit point and a lower limit point, the first plunger pump and the second plunger pump are connected to each other in series and connected to the solvent flow channel, and the pressure sensor has: a first pressure sensor to measure the pressure in the solvent flow channel of the first plunger pump; and a second pressure sensor to measure the pressure in the solvent flow channel of the second plunger pump.

8. An air bubble removal method of a liquid chromatographic apparatus having a liquid feeding pump to feed a solvent, a separation column to receive the solvent and a sample and separate the sample to components, a detector to detect the components, and a pressure sensor to measure a pressure in a solvent flow channel of the liquid feeding pump,
the method comprising the steps of:
starting purge operation that is operation of removing air bubbles in the solvent flow channel by the liquid feeding pump;

judging whether or not a pressure change amount in the solvent flow channel measured by the pressure sensor is a specified change amount or larger in the purge operation; and completing the air bubble removal operation when the pressure change amount is the specified change amount or larger, wherein the liquid feeding pump has a purge valve having a plurality of ports and switching to a position of feeding the solvent to the injector, a discarding position, or a closed position, and when a number of times that the pressure change amount in the solvent flow channel is not less than specified times an average pressure change amount within a specified time is less than a specified consecutive number of times, the purge valve is switched to the closed position, and when the pressure in the solvent flow channel exceeds a set pressure, the purge valve is switched to the discarding position.

9. The air bubble removal method of a liquid chromatographic apparatus according to claim 8, the method comprising the steps of:

judging that the pressure change amount in the solvent flow channel is the specified change amount or larger when the number of times that the pressure change amount at the timing of start of discharge of the solvent of the liquid feeding pump is not less than the specified times the average pressure change amount within the specified time is not less than the specified consecutive number of times; and completing the air bubble removal operation.

10. The air bubble removal method of a liquid chromatographic apparatus according to claim 9, the method comprising the steps of:

increasing the pressure in the solvent flow channel when the number of times that the pressure change amount in the solvent flow channel is not less than the specified times the average pressure change amount within the specified time is less than the specified consecutive number of times; releasing the solvent flow channel when the pressure in the solvent flow channel exceeds the set pressure; and removing air bubbles in the solvent flow channel.

11. The air bubble removal method of a liquid chromatographic apparatus according to claim 10, the method comprising the steps of:

releasing the solvent flow channel when the pressure in the solvent flow channel exceeds the set pressure and performing the purge operation; and displaying an error on a display unit when the number of times that the pressure change amount in the solvent flow channel is not less than the specified times the average pressure change amount within the specified time is less than the specified consecutive number of times and such case occurs a certain number of times.

* * * * *